United States Patent [19]

Larsen et al.

[11] 4,309,943
[45] Jan. 12, 1982

[54] CITRUS FRUIT JUICE EXTRACTOR

[75] Inventors: Gregory J. Larsen; William M. Easter, both of Lakeland, Fla.

[73] Assignee: FMC Corporation, Chicago, Ill.

[21] Appl. No.: 120,966

[22] Filed: Feb. 13, 1980

[51] Int. Cl.³ .......................... A23N 1/02; B30B 9/02
[52] U.S. Cl. ..................................... 99/509; 99/495; 100/98 R; 100/108; 100/213
[58] Field of Search ................. 99/495, 496, 509, 510; 100/37, 39, 98 R, 105, 108, 292, 213, 295, 237

[56] References Cited

U.S. PATENT DOCUMENTS

| | | | |
|---|---|---|---|
| 2,346,561 | 4/1944 | Delay | 100/108 |
| 2,649,730 | 8/1953 | Hait | 100/37 |
| 2,659,298 | 11/1953 | Hudson | 100/98 R |
| 2,780,988 | 2/1957 | Belk et al. | 100/37 |
| 3,030,878 | 4/1962 | Holzer | 100/237 |

*Primary Examiner*—Philip R. Coe
*Assistant Examiner*—Timothy F. Simone
*Attorney, Agent, or Firm*—Louis J. Pizzanelli; Richard B. Megley

[57] ABSTRACT

A citrus fruit juice extractor capable of processing at least 900 fruit per minute includes a set of lower extractor cups rigidly mounted in a linear arrangement to the extractor frame and a set of movable upper extractor cups adapted to interdigitate with the lower cups to extract juice from fruit received in the lower cups. The upper cups are mounted upon separate drive rods that are respectively clamped to cam follower arms, and the follower arms are sequentially driven by cams affixed in a balanced arrangement upon a camshaft to drive the upper extractor cups in a preselected sequence. The juice extractor further includes perforated strainer tubes extending downwardly of the lower extractor cups and hollow orifice tubes slidably received within the strainer tubes. The orifice tubes are sequentially driven by hydraulic slave cylinders that, in turn, are respectively controlled by master cylinders. Such master cylinders are driven by further cams mounted on the aforementioned camshaft so that the orifice tubes are sequentially operated in synchronization with the movement of the associated upper extractor cups.

14 Claims, 8 Drawing Figures

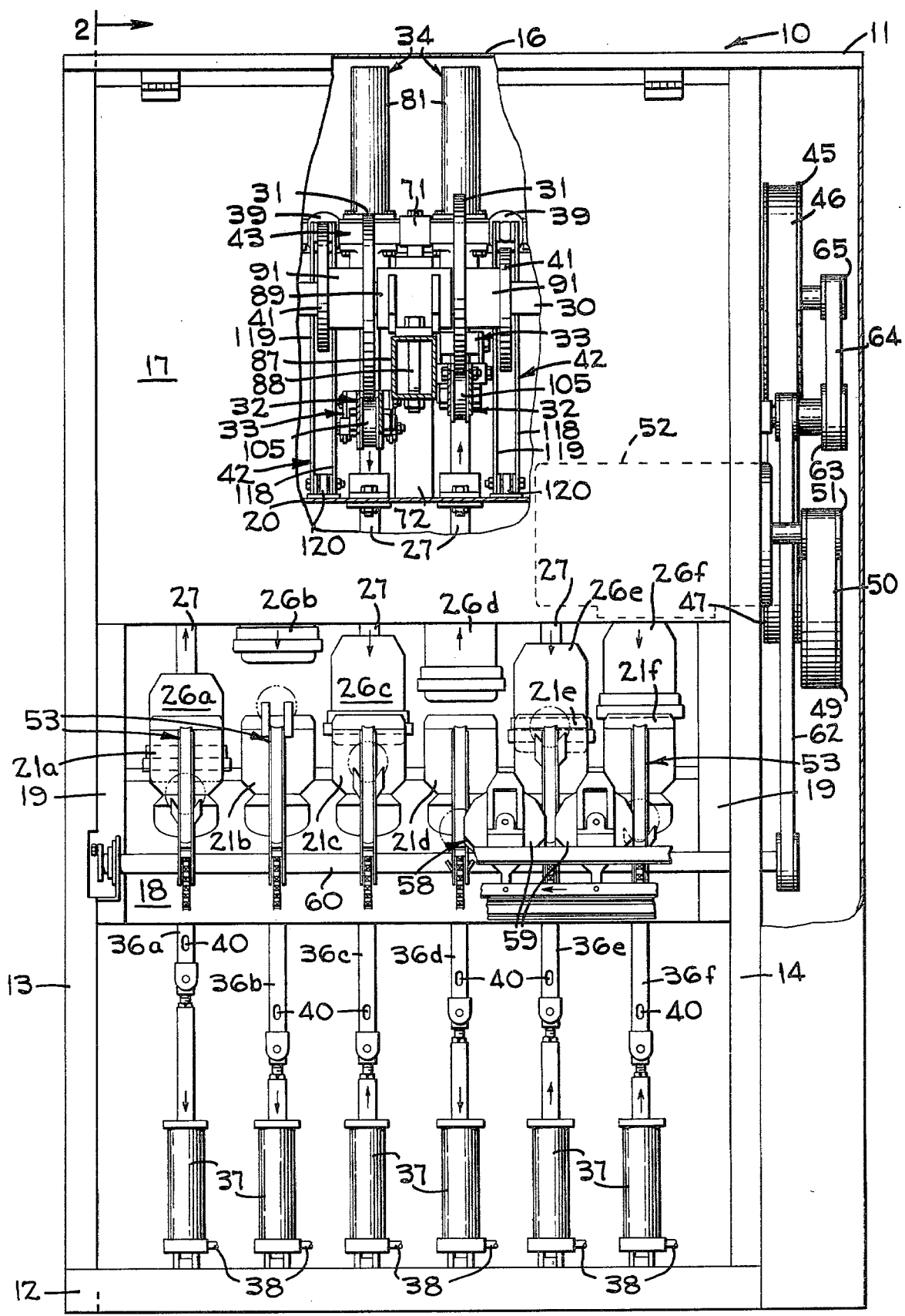
FIG_1

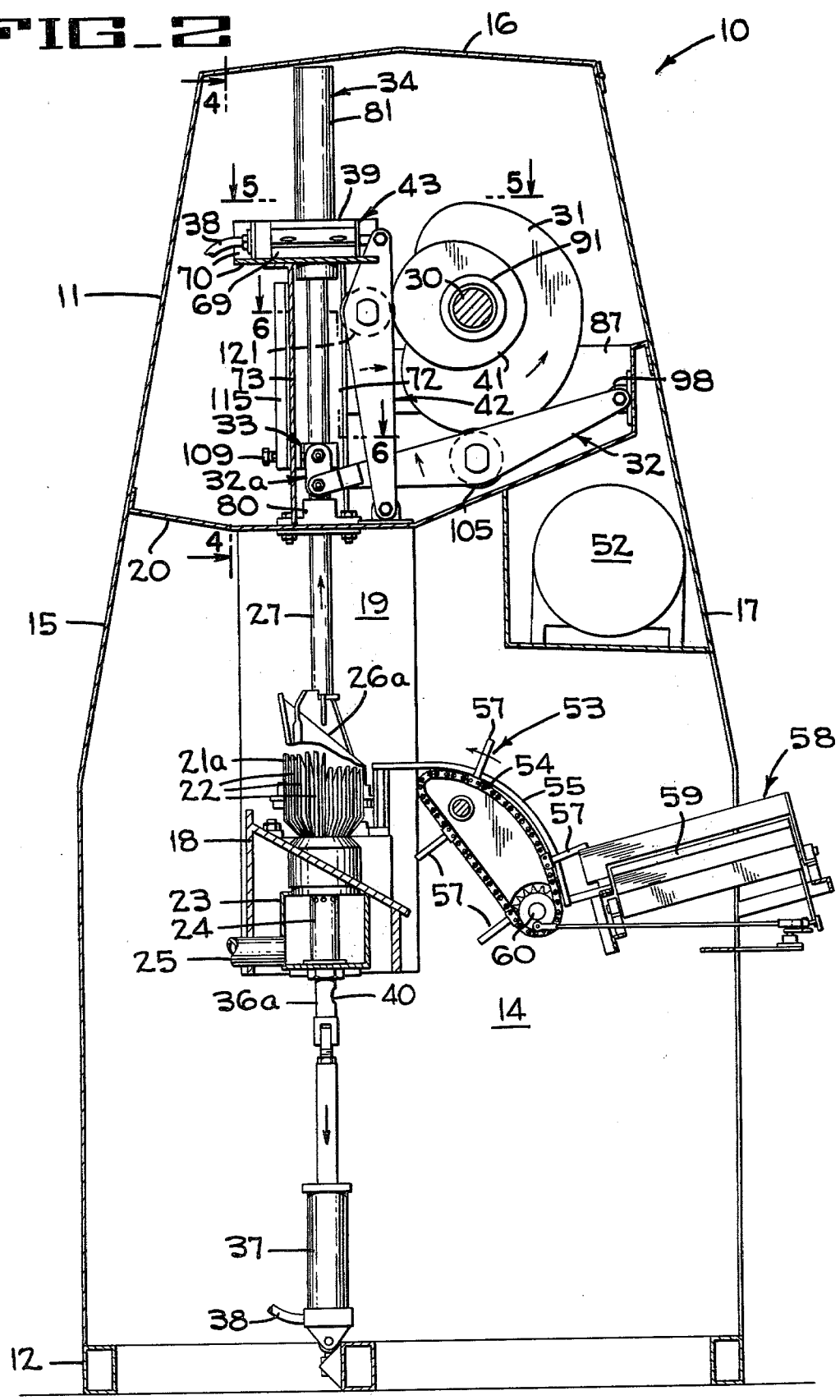

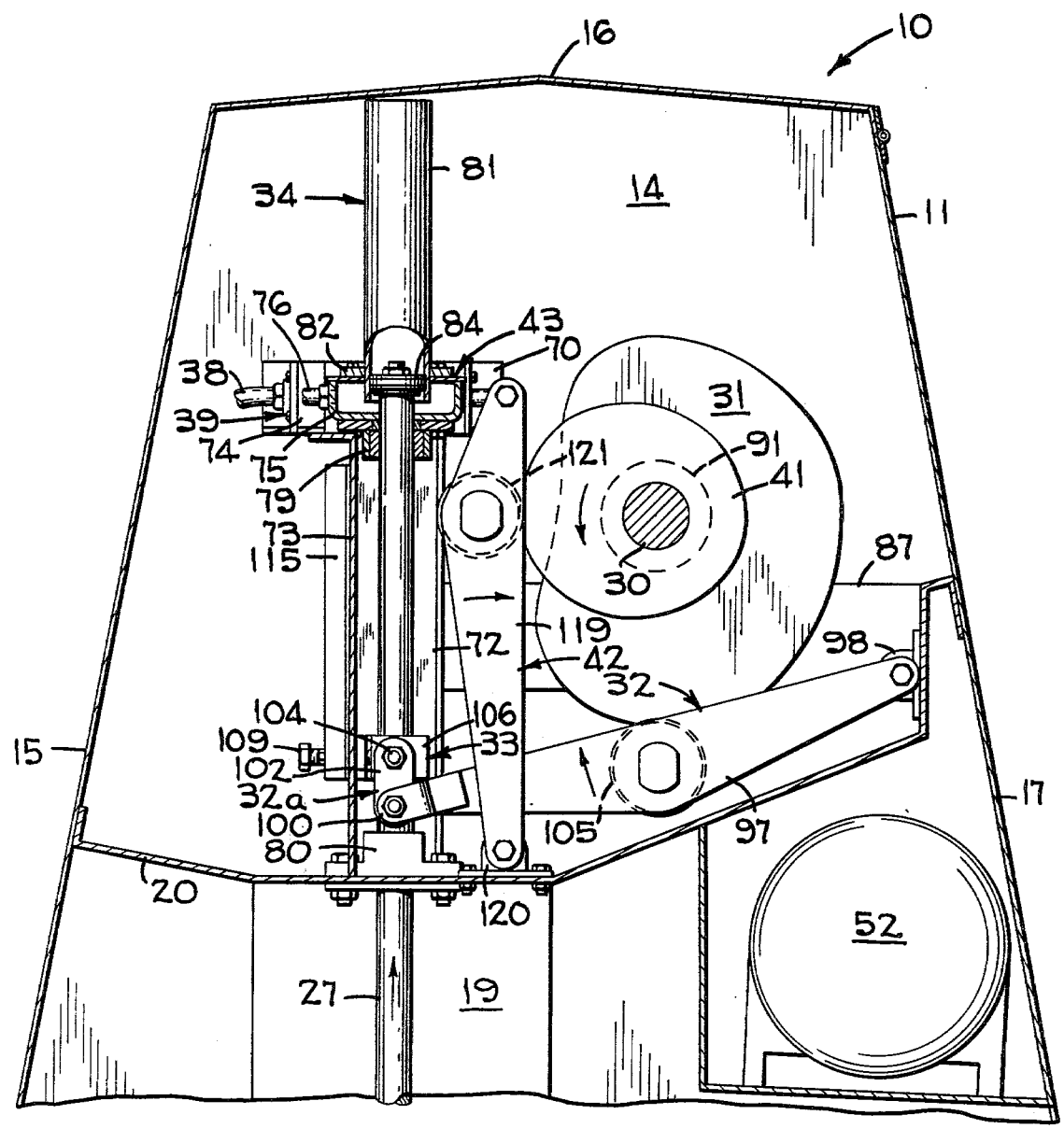
FIG_3

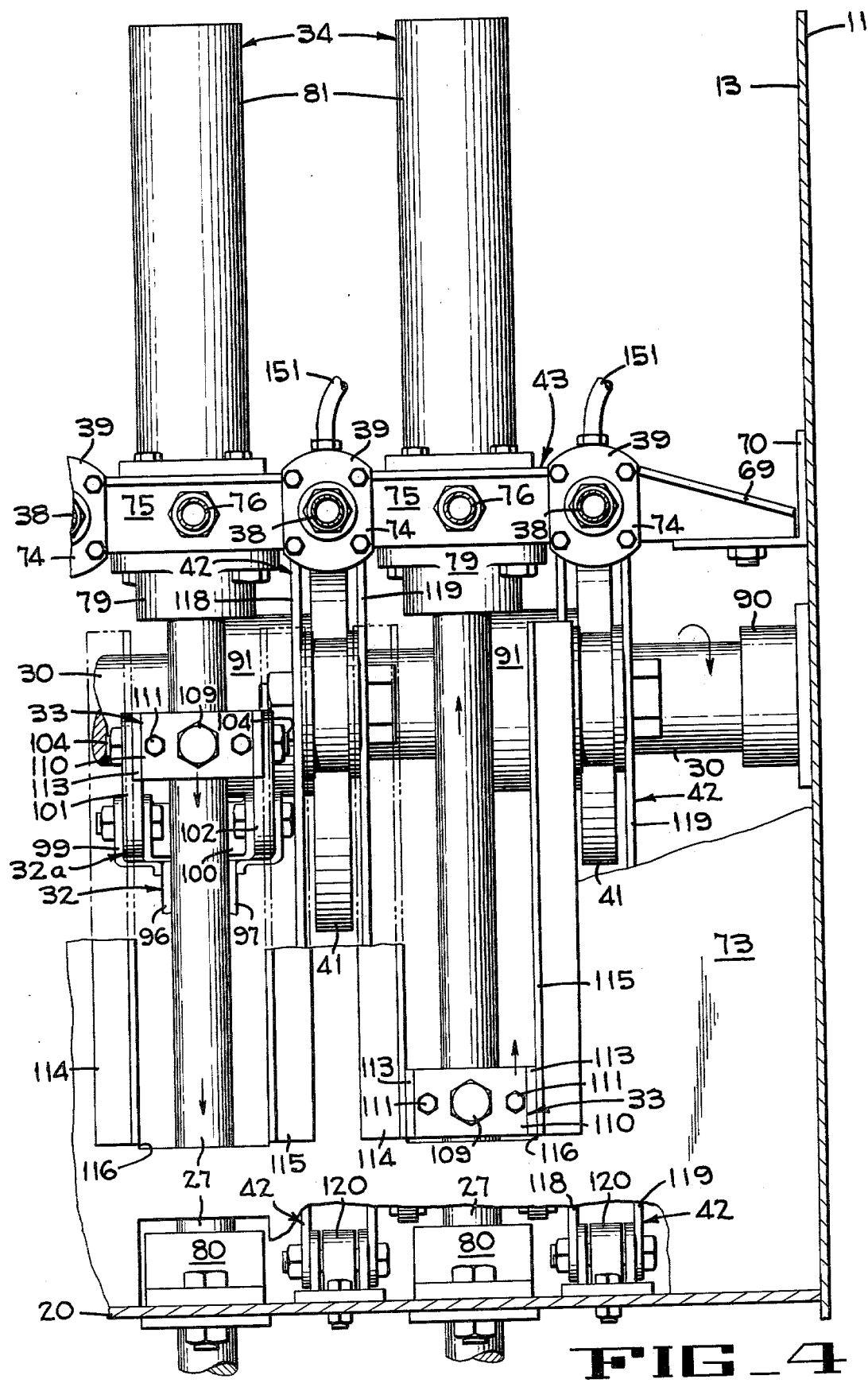
FIG_4

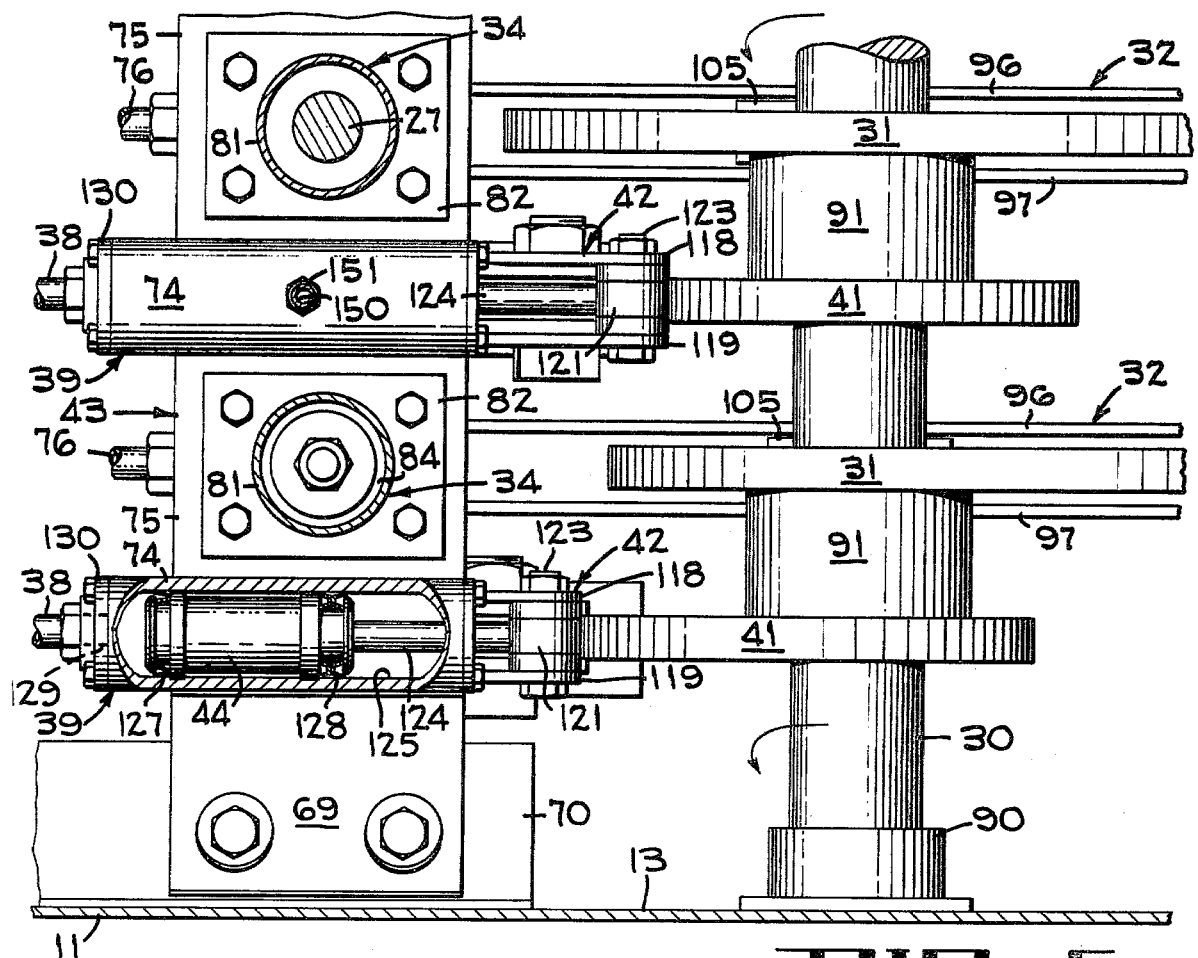
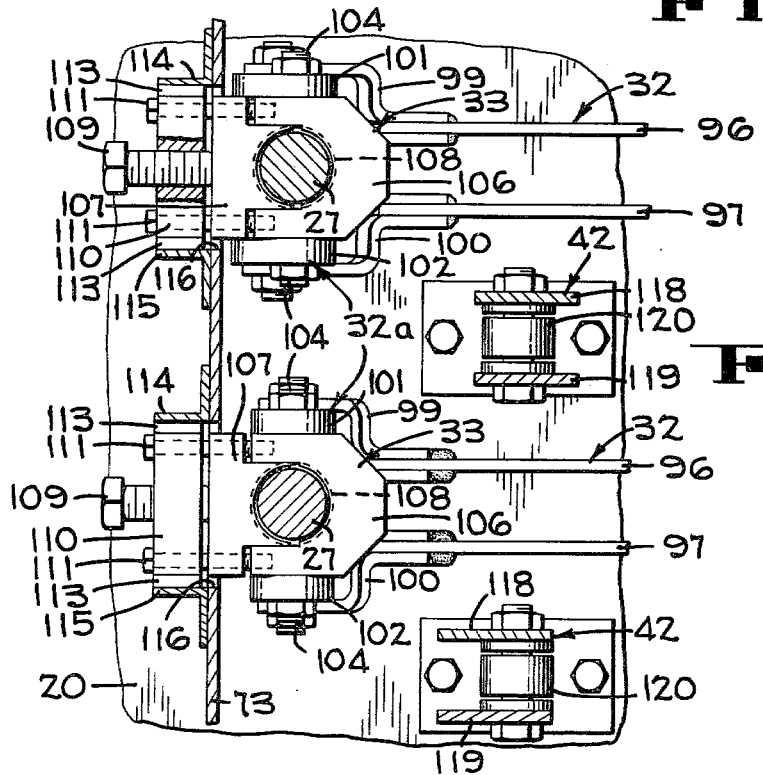

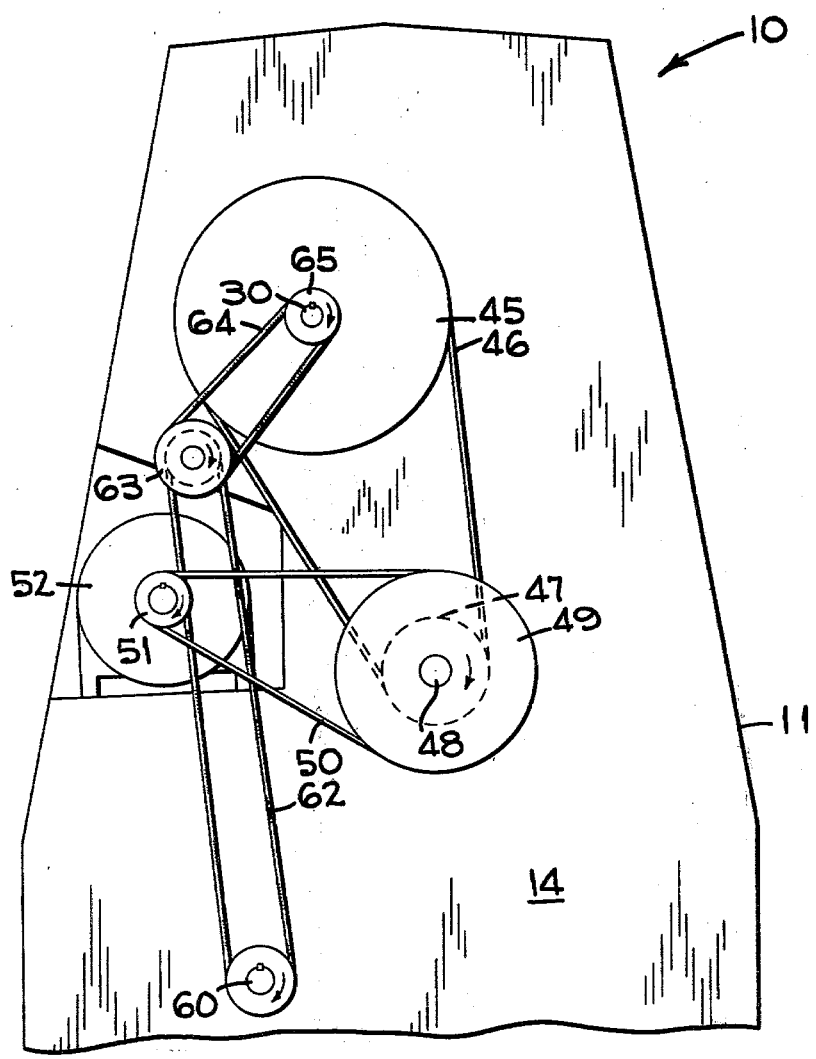
FIG_7

CITRUS FRUIT JUICE EXTRACTOR

BACKGROUND OF THE INVENTION

1. Field of the Invention

The present invention generally relates to fruit juice extractors, and more particularly, the present invention relates to a high speed citrus fruit juice extractor of the type wherein a citrus fruit is compressed between opposing cups that have fingers that interdigitate as the cups are brought together.

2. Description of the Prior Art

U.S. Pat. No. 2,649,730 to J. M. Hait and No. 2,780,988 to W. C. Belk et al disclose a type of high speed citrus juice extractor that utilizes a process of extraction wherein a hole is cut through the peel of a fruit to be extracted and then the entire surface of the fruit is compressed between a pair of cups to force the juice and pulpy internal material of the fruit (section membranes, seeds and core) through such hole. The cups include circumferentially spaced fingers which each form a hemispherical cavity and which are adapted to interdigitate as they are brought together to form a progressively smaller chamber to thereby compress the fruit. The internal portions of the fruit forced through said hole in the peel flow into a strainer tube without coming into contact with the outer peel. As the cups are brought together, a hollow orifice tube is progressively extended toward the cups within the strainer tube to force the juice through the perforations in the strainer tube and to eventually capture the pulpy material within the upper end of the orifice tube. In the prior art extractors of the interdigitating cup type, a plurality of pairs of cups are aligned to be driven by a common drive mechanism and all of the movable upper cups are rigidly attached to cup shafts which, in turn, are rigidly connected in a linear arrangement to a crosshead. The crosshead is driven by a cam arrangement so that all upper cups (usually three to five in number) are simultaneously driven to extract juice from seveal fruits at a time.

This type of extractor has been very popular due to the fact that, with the exception of a small hole cut through the peel, the peel is not cut prior to extraction, nor is the juice brought into contact with the outer peel, thereby minimizing the possibility of peel oil mixing with the juice being extracted. The oil exuded from the peel during extraction remains outside of the peel and is collected by an oil recovery system. This type of extractor is thus capable of producing high quality citrus peel oil concurrently with the extraction of citrus juice.

Although the extractor shown in the U.S. Pat. Nos. 2,780,998 and 2,649,730 has functioned very satisfactorily, it is subject to several shortcomings. With the rise in popularity of citrus juice food products in recent years, the citrus juice producers have demanded that juice extractors be adapted to operate at higher production rates. It has been found that the prior art juice extractor of the type just described is capable of satisfactorily operating at a maximum rate of 100 fruit per cup per minute. Thus, to increase productivity, it has been heretofore necessary to increase the number of extractors, which of course requires more floor space and thus often requires very costly plant expansion.

Another problem associated with the prior art extractor concerns its efficiency of operation. As previously indicated, in the prior art extractor, the upper cups are mounted to a crosshead and the crosshead is driven to simultaneously compress several fruit between the several upper and lower cups of the extractor. It is further noted that all of the orifice tubes in such extractor are mounted to a crosshead that is driven by pull rods connected to the upper cup crosshead. The extractor will be understood to operate like a punch press. It requires a great amount of power to simultaneously extract juice from the several fruit. The main camshaft is first subjected to a large torque in one rotative direction as the cups and orifice tubes are driven toward each other; and thereafter, upon the reversal of movement of the tubes and cups, the main camshaft undergoes a rapid and drastic torque reversal due to the action of return springs.

Yet another problem associated with the prior art extractor concerns the high noise level generated thereby. Heretofore, the only apparent means for reducing such high noise level was to provide an insulated container (or shield) for enclosing such drive mechanisms. Vibration also caused problems with the prior art extractors and required that the frame be securely bolted down.

SUMMARY OF THE INVENTION

The present invention provides an improved citrus fruit juice extractor which, when compared with the extractors of the prior art, is capable of processing fruit at a much higher production rate, of drastically reducing the energy requirements as measured per fruit extracted, and of operating at a very low noise level. Generally, the improved citrus fruit juice extractor of the present invention includes a plurality of pairs of opposing cups arranged in a line for receiving a fruit for juice extraction with one of each pair of cups being generally rigidly mounted to the frame of the extractor and with the other cup being movable. Each cup includes fingers that interdigitate with the fingers of the opposing cup to compress the fruit as the cups are brought together. A strainer tube is associated with each pair of cups for providing a passage for juice extracted from the fruit.

In accordance with the present invention, a drive assembly is provided for sequentially driving the movable cups of each pair of cups in a timed sequence. This is preferably done by providing that the drive members which drive the movable cups are connected with a drive shaft at different angular positions uniformly spaced about the drive shaft. Thus, the fruit in the various aligned sets of extractor cups are compressed at different rotative positions of the drive shaft.

The improved citrus juice extractor of the present invention can be operated at a substantially higher rate than the aforementioned prior art extractor wherein all cups are driven simultaneously in punch-press fashion. For example, the extractor of the present invention is capable of extracting fruit at a rate of at least 150 fruit per cup per minute. In an extractor that includes six pairs of extractor cups, the total rate of at least 900 fruit per minute can be achieved. Moreover, in the citrus fruit extractor of the present invention, the main drive shaft is never subject to torque reversal, but rather is subjected only to a unidirectional torque of general uniformity (depending on the number of pairs of cups in the extractor). This assures that the extractor will be subjected to minimal wear and will be less noisy than the prior art extractor.

BRIEF DESCRIPTION OF THE DRAWINGS

FIG. 1 is a somewhat diagrammatic front elevation of the improved citrus fruit juice extractor of the present invention, with various parts of the extractor housing and fruit feeding apparatus being broken away.

FIG. 2 is a section taken generally on line 2—2 of FIG. 1.

FIG. 3 is an enlarged fragmentary section that illustrates the drive mechanisms for one of the upper extractor cups and part of the drive mechanism for the associated orifice tube.

FIG. 4 is an enlarged fragmentary section taken generally on line 4—4 of FIG. 2.

FIG. 5 is an enlarged section taken generally on line 5—5 of FIG. 2.

FIG. 6 is an enlarged section taken generally on line 6—6 of FIG. 2.

FIG. 7 is a diagrammatic side elevational view which illustrates the belt drive arrangement of the juice extractor.

DESCRIPTION OF THE PREFERRED EMBODIMENT

Figure 8:
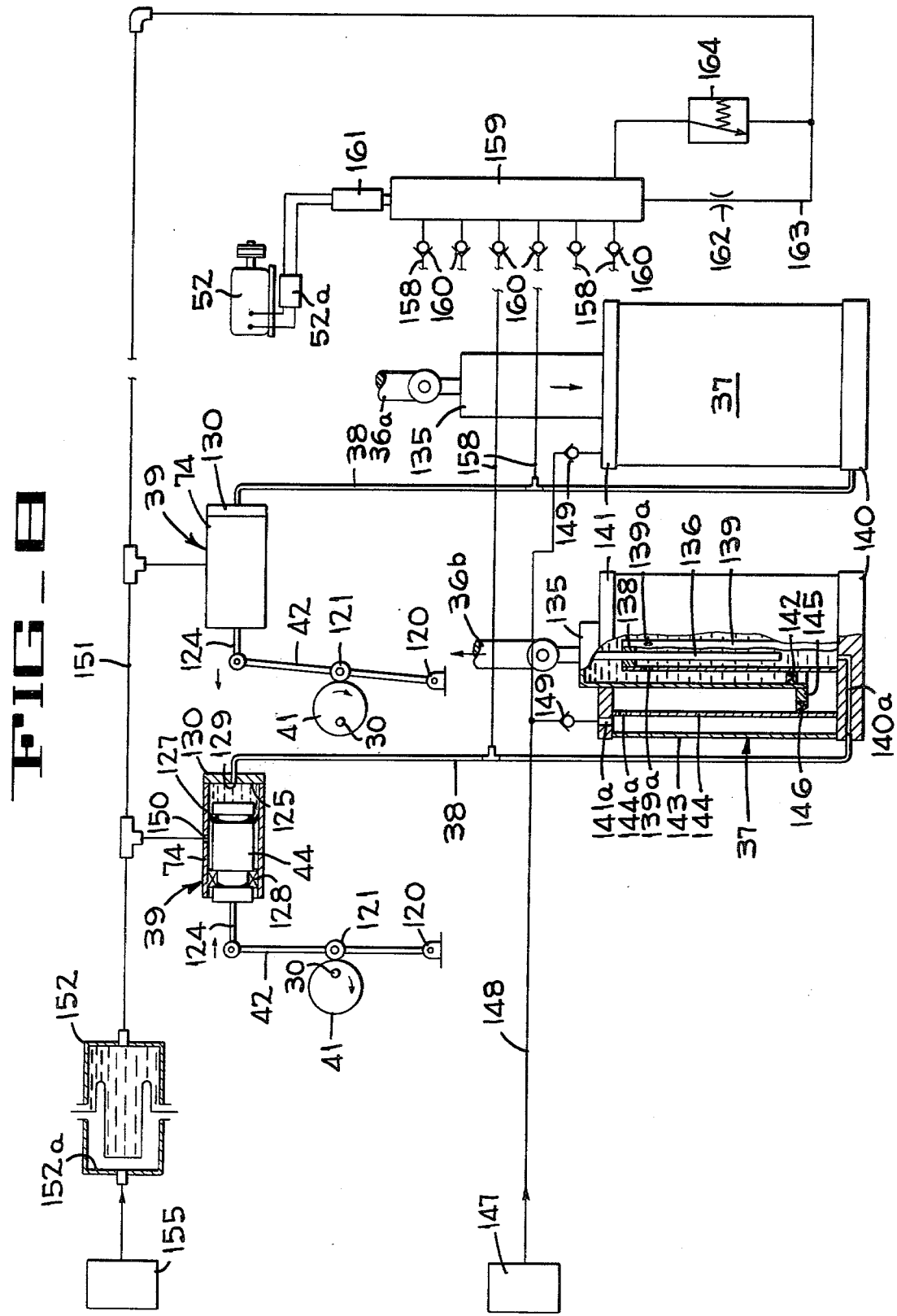
FIG. 8 is a schematic view that illustrates the hydraulic circuit of the sequential drive mechanism for the orifice tubes.

Referring now more particularly to FIGS. 1 and 2, a citrus fruit juice extractor 10 will be seen to include a housing 11 of a unitary construction including a base frame 12 formed of tubular members, side panels 13 and 14, a rear wall 15, a top wall 16 and a front wall 17. A lower extractor cup bedplate 18 is mounted transversely between channels 19 that are vertically connected to the side panels 13 and 14. A contoured wall 20 (FIG. 2) is mounted transversely between the side panels and the front and rear walls above the bedplate. It is noted that the drive mechanisms for the upper extractor cups, to be described later, are isolated from the extractor cup area by the wall 20.

As shown in FIG. 1, six lower extractor cups 21a-21f are bolted to the bedplate 18 to extend vertically upwardly therefrom at uniform transverse spacings. Six upper extractor cups 26a-26f are rigidly mounted on separate, reciprocatable upper cup drive shafts 27 directly above the lower cups 21a-21f, respectively. The cup drive shafts are mounted for reciprocation along vertical axes that are aligned with the lower cups. Such upper and lower cups are of the same construction as the extractor cups disclosed in the aforementioned U.S. Pat. No. 2,780,988. Each extractor cup includes fingers 22 (FIG. 2) that are equiangularly arranged in an annular array (i.e., in uniform circumferential spacings) to form a cavity for receiving a citrus fruit. As in the aforedescribed prior art extractors, the fingers of the opposing upper and lower cups are adapted to interdigitate and to form a progressively smaller fruit receiving cavity as the upper cup is driven toward the lower cup.

Referring to FIG. 2, a tubular juice manifold 23 is mounted to the underside of the bedplate 18 to extend parallel thereto. As explained in the aforementioned prior art patents, the manifold receives juice forced through strainer tubes 24 that extend vertically upwardly through the manifold to the interiors of the lower cups 21a-21f and that are perforated to filter pulpy material from the extracted juice. Juice that is forced through the strainer tubes into the manifold drains therefrom into an outlet conduit 25.

According to an important aspect of the present invention, the extractor 10 includes an assembly for driving the upper cups 26a-26f toward the lower cups in a sequential relationship and in a balanced manner so that only one pair of upper and lower cups will be operative to fully compress a citrus fruit at one point in time. The upper cup drive assembly generally includes a cam shaft 30 (FIGS. 3, 5 and 7), six cam discs 31 (one for each upper cup) mounted on the cam shaft, six cam follower arms 32 operatively associated with the cam discs 31, and the aforementioned drive rods 27. As shown in FIG. 3, the outer ends of the follower arms 32 are pivotally mounted to the housing wall 20, and the inner ends of the cam follower arms are pivotally attached to links 32a which, in turn, are connected to clamp blocks 33 that are clamped upon the cup drive shafts 27. The upper cup drive shafts are individually biased upwardly by pneumatic cylinders or air springs 34, which cylinders will be described in detail hereinafter.

The extractor 10 further includes six orifice tubes 36a-36f (FIG. 1) that are slidably received in the strainer tubes 24 for the purpose of exerting pressure on the juice and pulpy material during extraction to thereby force the juice through the perforations in the upper end of the strainer tubes. As described in the aforementioned U.S. Pat. No. 2,649,730, each orifice tube is hollow so that the peel plugs and the pulpy material within the citrus fruits may be progressively forced through the tube and therefrom through an outlet 40 at its lower end. The orifice tubes 36a-36f are respectively driven by slave cylinder assemblies 37 at the lower ends thereof which assemblies are operatively connected via conduits 38 to respective master cylinders 39 positioned at the upper end of the machine adjacent the air springs 34.

As shown in FIGS. 4 and 5, the master cylinders 39 of the orifice tube drive mechanisms and the air springs 34 that upwardly bias the upper cup drive shafts are incorporated in a staggered series in a crosshead assembly 43 that is attached between the side panels 13 and 14 of the extractor housing at the upper end of the housing.

The orifice tube drive mechanism further comprises six cam discs 41 that are mounted on the camshaft 30 in alignment with the master cylinders 39, the cam discs 41 being substantially smaller than the cam discs 31 (FIG. 2). The pistons 44 of the master cylinders 39 are respectively operated by cam follower arms 42 that are pivotally connected to the housing wall 20 directly below such pistons (FIG. 2). As will be described hereinafter, the cam discs 41 are mounted in predetermined phase relationships on the cam shaft 30 so that the master cylinders activate the associated slave cylinder assemblies 37 in perfect timed relationship with the movement of the associated upper cups 26a-26f, thereby controlling the movements of the orifice tubes 36a-36f relative to the movements of the associated upper cups.

Referring next to FIGS. 1 and 7, the upper cup drive mechanism will be seen to further comprise a pulley 45 that is mounted near the end of the main cam shaft 30 and outside of the housing side panel 14. A belt 46 (FIG. 7) is entrained on such pulley and also on a further pulley 47 that is secured to an idler shaft 48. A relatively larger pulley 49 is mounted outward of the pulley 47 on the idler shaft, and a belt 50 is connected between the pulley 49 and a drive pulley 51 mounted to the shaft of a motor 52. It will be recognized that the rate of reciprocation of the upper cups 26a-26f and the orifice tubes 36a-36f will directly correspond to the speed of the motor. The illustrated extractor is designed to operate at a rate of 150 fruit per cup per minute, that is, at a rate of 900 fruit per minute through the six pairs of extractor cups.

Fruit are fed in a sequential manner to the lower cups 21a-21f by six sequential feeders 53 comprising chain conveyors 54 (FIGS. 1 and 2) aligned with the cups. These sequential fruit feeders are the subject of a co-pending United States patent application filed concurrently herewith by Elmer F. Frost et al, such copending application being entitled High Speed Fruit Feeding Apparatus and identified by Attorney's Docket No. SJ 9094. This copending application is assigned to the assignee of the present invention, and the disclosure thereof is specifically incorporated herein by reference. Generally, each chain conveyor 54 has flights or fingers 57 uniformly spaced thereon and extending outwardly thereof which are each adapted to cradle a fruit, to move the fruit upwardly over an arched bridge 55, and to propel the fruit from the bridge into a lower cup.

A hopper mechanism 58 is provided for feeding fruit in transversely spaced single files to the chain conveyors 54 of the feeders 53. This hopper mechanism is disclosed in a further copending patent application that was also filed concurrently herewith by Gregory J. Larsen entitled Feeder For Fruits and the Like and identified by Attorney's Docket No. SJ 9274. The hopper mechanism includes several transversely spaced, downwardly inclined ramps 59 which are oscillated through limited arcs about their respective axes to assure rapid single-file feeding of the fruit to the feeder conveyors 54.

The sequential feeders 53 include a common feeder drive shaft 60 that is operatively connected to the several chain conveyors 54 so that the conveyors feed the fruit to the extractor 10 in timed relation to the movements of the associated upper extractor cups. As shown in FIGS. 1 and 7, the feeder drive shaft 60 is driven by a timing belt 62 that is entrained on a toothed idler pulley 63 which, in turn, is positively driven by a further timing belt 64 connected to a toothed pulley 65 at the end of the camshaft 30. Such positive drive connection of the fruit feeder drive shaft to the camshaft that operates the extractor cups assures such that the fruits will be fed to the associated lower cups 21a-21f in appropriate timed relation to the movement of the associated upper cups 31a-31f.

Having thus given a general description of the citrus fruit juice extractor 10, a detailed description of various parts of the extractor will now be presented.

CROSSHEAD ASSEMBLY

The crosshead assembly 43 in which the air springs 34 and the master cylinders 39 are incorporated will be seen in FIGS. 1 and 2 to extend transversely between the side panels 13 and 14 at the top of the machine. The crosshead assembly includes end pieces 69 (FIG. 4) that are bolted to rails 70 that are, in turn, affixed to the housing side panels 13 and 14 and a center piece 71 (FIG. 1) that is fastened to a column 72 (FIGS. 1 and 3) that extends upwardly from the wall 20. The column 72 is welded to a further upright wall 73 (FIG. 3) that extends the width of the housing between the side panels. Each of the master cylinders 39 includes a cylinder block 74, which is rounded at its top and bottom and flattened at its sides (FIGS. 4 and 5). Each of the air springs 34 includes a tubular base section 75 of a rectangular cross section (FIG. 3) that is secured between adjacent cylinder blocks 74. The cylinder blocks 74 and tubular base sections 75 are aligned in an alternating arrangement so that the cylinder blocks are aligned with the cam discs 41 and so that the tubular base sections are over the lower extractor cups 21a-21f. The air springs are provided with air under a selected pressure through conduits 76 (FIGS. 4 and 5) that are connected to the cylinder blocks. Check valves (not shown) are installed in the conduits to permit one-way air flow from the pressure source (not shown) such as a pressure regulated connection to available shop air.

Apertures are formed in the bottom walls of the tubular base sections 75 (FIG. 3) of the crosshead assembly, and bearings 79 for the cup drive shafts 27 are bolted (FIG. 4) to each crosshead section to guide the cup shafts in the apertures. Further, the housing wall 20 has apertures therein through which the cup drive shafts extend, and bearings 80 are mounted directly below the bearings 79 upon the housing wall 20 about said apertures. As best illustrated in FIG. 3, the bearings 79 and 80 are separated by a substantial distance to provide stable guidance for the reciprocation of the cup shafts 27.

Referring to FIGS. 3–5, each of the air springs 34 further comprises a cylindrical tube 81 mounted within an aperture in the top wall of the tubular base section 75 to extend coaxially with the cup shaft bearings 79 and 80. A piston 84 is mounted on the upper end of each cup drive shaft 27. The mounting of the air spring tube 81 is provided by a flange 82 adjacent the lower end of the tube 81 with the flange 82 being bolted to the top wall of the tubular base section 75 to form an airtight seal therewith. The flange 82 is spaced from the lower end of the tube 81 so that the lower end will be spaced from the bottom wall of the tubular base section to provide an annular passage therebetween. It should be understood that the interior of the tubular base section 75 surrounding the lower end of the tube forms an extension of such tube. This extension provides an appropriate compression ratio for the air spring while minimizing the height thereof, thereby minimizing the head space requirements for the entire extractor housing 11.

CAMSHAFT

Referring to FIGS. 3, 4 and 5, camshaft 30 is received in pillow block bearings 90 which are rigidly secured to the side panels 13 and 14 so that the camshaft extends transversely of the housing somewhat below the crosshead assembly and above the feeders 53 that feed fruit to the lower cups. The center of the camshaft is further supported within a sleeve bearing 89 (FIG. 1) that is disposed between the centermost cam discs 31 associated with the upper cups 26c and 26d. The bearing 89 is secured by bolts 88 (FIG. 1) to a box beam 87 (FIGS. 1 and 3) that is mounted between the upturned portion of the wall 20 and the column 72.

To provide precise synchronization of the upper cup and orifice tube movements, the cam discs 31 for operating the upper cup shafts 27 and the cam discs 41 for operating the orifice tubes 36a–36f are mounted in pairs of discs 31, 41 upon sleeves 91 (FIG. 5) and each of such paired cam disc assemblies is mounted in a different rotative position upon the camshaft 30. Referring to FIG. 5, the discs 31 and 41 associated with extractor cup 26a and the associated orifice tube 36a are mounted on a sleeve 91 to form one paired cam disc assembly, while another paired cam disc assembly for 26b, 36b is affixed to the shaft 30 at an adjacent position thereon and at a rotative or angular position on the shaft that is 120° in advance of the aforementioned cam disc assembly for 26a, 36a. Each paired cam disc assembly is identical except that those on one side of the central sleeve bearing 89 (FIG. 1) are the mirror image of those on the other side thereof. The six assemblies are attached to the cam shaft so that the assemblies rotate in a predetermined phase relationship to each other that provides balanced, relatively vibration-free operation. In particular, the paired cam disc assemblies are mounted upon the shaft in multiples of 60° so that the upper cups sequentially achieve a fully lowered position in the following sequence: cup 26a; then cup 26e; cup 26c; cup 26f; cup 26b; and cup 26d.

CAM FOLLOWER ARMS/UPPER CUP DRIVE

The cam follower arms 32 that are operatively connected to the upper cup drive shafts 27 are all of the same construction. As illustrated in FIGS. 3-6, each arm includes a pair of parallel triangular plates 96 and 97. The plates are pivotally connected at one end to a bearing 98 that is attached to the housing wall 20 to permit the plates to pivot in a vertical plane that is aligned with the associated cam disc 31. Brackets 99 and 100 (FIG. 6) are provided at the opposite ends of the plates 96 and 97, and are pivotally attached to links 32a. The links 32a include a pair of bars 101 and 102 pivotally mounted at one of their ends to the brackets with the other ends of the bars being pivotally engaged on stud pins 104 extending from opposite sides of the respective clamp block assembly 33. A cam follower roller 105 is rotatably mounted between the plates 96, 97 of each cam follower arm at a position that engages the cam disc 31 at a point directly below the camshaft. It will be noted in FIG. 3 that the cam follower arms 32 and the links 32a are arranged so that the links extend vertically downwardly from the clamp blocks 33 when the arms, and thus the cup shafts 27, are fully lowered.

CLAMP BLOCK ASSEMBLIES

The various clamp block assemblies 33 (FIG. 6) are also of identical construction. Such clamp block assemblies are adapted to clampingly engage the respective cup shaft 27 with frictional force that is great enough to cause the associated cup 26a-26f to extract juice from a citrus fruit but which is small enough so that if a hard object is engaged between an opposed pair of cups, the clamp block assembly will slip on its cup shaft, thereby preventing damage to the extractor cup and other extractor parts. Each clamp block assembly includes a U-shaped member 106 disposed on that side of the cup shaft that is adjacent the cam follower arm 32, this being the member to which the links 32a are attached. An abutment member 107 is disposed on the opposite side of the cup shaft having a projecting abutment which is received in the throat of the U-shaped member 106. The inner end of the abutment and the opposing portion of the member 106 are hemi-cylindrical to receive a split brass bushing 108 that is, in turn, received on the cup shaft 27. Abutment member 107 is forced toward the cup shaft by an adjusting screw 109 that is threadably received in a block 110, and block 110 is attached by bolts 111 to U-shaped member 106. The adjusting screw 109 bears against the outer face of the abutment member 107 which is slidable on the bolts 111 to create a selected frictional gripping force between the entrapped bushings 108 and the cup shaft.

As shown in FIGS. 4 and 6, the clamp block assemblies 33 are adapted to slide between guide rails 114 and 115 that are affixed to the upright wall 73. Strips 113 made of wear resistant, low friction plastic are attached to the sides of the outer block 110 to ride against the guide rails 114, 115. It will be seen in FIG. 4 that the wall 73 has vertical slots 116 formed therein through which the clamp block assemblies 33 extend, and the rails 114, 115 are vertically attached to the wall 73 adjacent the edges of such slots. The cup shafts 27 are initially secured within the clamp block assemblies so that the fingers of the upper cups 26a-26f are properly aligned above the gaps between the fingers of the underlying lower cups 21a-21f. That is to say, the clamp block assemblies secure the cup shafts in rotative positions that are adapted to permit the upper and lower cups to properly interdigitate.

The clamp block assemblies 33 are thus adapted to prevent damage to the upper and lower cups, the drive shafts 27 and the associated drive elements in the event that a hard object is accidentally fed to a lower cup. Also, the adjustable clamp block assemblies and guide rails 114 and 115 cooperate to permit the cup shafts to be precisely aligned therein so that the fingers of the upper and lower cups properly mesh.

ORIFICE TUBE DRIVE MECHANISMS

As previously indicated, orifice tubes 36a-36f are respectively driven by slave cylinder assemblies 37, and the slave cylinder assemblies are respectively controlled by master cylinder 39. It will be further recalled that the master cylinders are driven by the cam follower arms 42 that, in turn, are operated by the cam discs 41. The cam follower arms 42 each consist of a pair of parallel plates 118 and 119 (FIG. 5), and such plates are pivotally connected at their lower ends to a bearing 120 (FIG. 6) which is fastened to the housing wall 20 so that the cam follower arm extends generally vertically upwardly between the camshaft 30 and the cup shaft 27. A cam follower roller 121 is rotatably mounted between each pair of plates 118, 119 near the upper ends thereof at the level of the camshaft to be engaged by the associated cam disc 41. The upper ends of the plates 118, 119 are pivotally connected by a bolt 123 to the piston rod 124 of the respective master cylinder (FIG. 5). It will be seen from FIG. 3 that as the camshaft 30 rotates, each cam disc 41 will pivot the cam follower arm 42 in a vertical plane to force the associated piston rod 124 into the respective master cylinder to thereby pressurize the oil in such cylinder in timed relation to the movement of the associated upper cup.

The construction of each of the master cylinders 39 is shown in FIGS. 5 and 8. The cylinder block 74 of each master cylinder has a bore 125 formed therein, and the piston 44 is received within the bore and is engaged at one end by the piston rod 124. The piston has grooves adjacent both ends and annular seals 127 and 128 are received within such grooves. The seal 128 adjacent the piston rod is a two-way seal, whereas the other seal 127 adjacent the discharge port 129 for the conduit 38 (leading to the associated slave cylinder) is a one-way seal that permits leakage in the direction of such port, but not in the opposite direction. The discharge end of the cylinder block 74 is sealed by a plate 130 that is bolted to the block, the port 129 being formed in the plate 130.

As diagrammatically illustrated in FIG. 8, each of the slave cylinder assemblies 37 includes a tubular piston 135 to which the respective orifice tube 36a-36f is connected. A guide rod 136 having a square cross-section extends coaxially within the tubular piston 135 from the upper end thereof, and the guide rod is received in a similarly shaped aperture within a collar 138 mounted in the upper end of a stationary tube 139. Tube 139 is mounted to a base plate 140, and such base plate 140 is pivotally mounted to the base 12 of the extractor (FIG. 1). The guide rod 136 and tube 139 cooperate to prevent the interconnected orifice tubes from rotating, thereby assuring that the openings 40 in the orifice tubes face in one direction. The tube 139 has a number of apertures 139a formed therein to permit oil to flow from the interior of the tube 139 into the interior of the surrounding tubular piston 135, and an oil inlet passageway 140a is formed in the base 140 which communicates between the interior of tube 139 and the respective conduit 38 from the associated master cylinder 39. The tubular piston 135 is received within a bore formed in a top plate 141 at the upper end of the cylinder assembly. A sealing ring 142 is mounted within the lower end of the tubular piston, and such sealing ring forms a fluid-tight seal with the outer surface of the stationary tube 139. It will be appreciated that, with this arrangement, the tubular piston 135 will be elevated when the associated master cylinder 39 is actuated by the associated cam disc 41.

Each slave cylinder assembly 37 further includes an air spring portion that includes coaxial tubes 143 and 144 that surround the tubular piston 135 and extend between the base plate 140 and top plate 141. An air inlet port 141a is formed through the top plate 141 to communicate with the annular passageway between the tubes 143 and 144. Apertures 144a are formed in the upper end of the tube 144. A collar 145 is attached to the outside surface of the tubular piston adjacent the lower end thereof, and an annular seal 146 is attached to such collar to form an air-tight sliding seal with the interior of tube 144. Air under a constant pressure is provided by a suitable pressure source (such as pressure-regulated shop air) 147 to act through conduits 148 that are connected to the ports 141a, and check valves 149 are provided in the conduits 148 to provide one-way air flow into the slave cylinder assemblies. The pressure of the air trapped in the space between the tubes 143 and 144 and the space between the tube 144 and the tubular piston 135 acts against the collar 145 and seal 146 to lower the tubular piston and to force the oil in the associated conduit 38 back into the respective master cylinder 39.

The orifice tube drive mechanisms further include a common means for outwardly biasing the pistons 44 of the master cylinders 39 to thereby keep the cam follower rollers 121 in continuous contact with the cam discs 41 (FIG. 5). As shown in FIGS. 5 and 8, a further oil inlet port 150 is formed through the cylinder block 74 of each of the master cylinder assemblies at approximately the centers thereof. Conduits 151 are connected to such ports, and the conduits are supplied with oil under a constant pressure by a pressurized reservoir 152 comprising an air-actuated diaphragm type. The air chamber of the reservoir communicates with a source of air under pressure 155 (again, such source may be a pressure-regulated shop air connection). Accordingly, the constant oil pressure provided by the reservoir acts on the seal 128 at the end of the master cylinder piston 44 to assure that the cam follower roller 121 will remain engaged against the associated cam disc 41 thereby preventing clattering and undue wear on such parts.

SHUT-DOWN CONTROL CIRCUITRY

Extractor 10 further includes an hydraulic and electrical control circuit (FIG. 8) for de-energizing the motor 52 when the movement of any of the orifice tubes is obstructed. Referring to FIG. 8, it will be seen that conduits 38 are connected to conduits 158 between the master and slave cylinder assemblies. The conduits 158 all lead to a manifold 159, and check valves 160 are installed in the conduits 158 to permit flow only into the manifold. A pressure-sensitive electrical switch 161 is connected to the manifold to sense the pressure therein and to generate a cut-off signal in the event that the pressure within the manifold exceeds a preset level. Such cut-off signal deactivates the motor starter 52a for the motor 52 to stop the extractor in the event that the movement of an orifice tube is obstructed.

To assure that the switch 161 is not activated by small pressure peaks associated with oil expansion, such peaks are vented from the manifold 159 through a flow restrictor valve 162 having a predetermined orifice size. The restrictor is disposed in a conduit 163 that communicates with the pressurized reservoir 152. A relief valve 164 is connected to the manifold in parallel with the flow restrictor. The relief valve is set to by-pass flow when the pressure in the manifold exceeds the pressure at which the switch 161 is operated. Thus, the relief valve will by-pass flow from the manifold back to the reservoir to prevent damage to the slave cylinder assemblies 37 or to the orifice tubes 36a–36f.

OPERATION

Citrus fruit, for example oranges, are continuously fed on an inclined belt (not shown) to the upper end of the drums of the hopper 58 (FIG. 2). Fruit are fed in transversely spaced files between the hopper feed chutes while the hopper ramps 59 are oscillated to assure uninterrupted, high speed feeding to the chain conveyors 52 of the feeders 53. The chain conveyors 54 of the feeders are driven in timed relation to the motion of the upper extractor cups 26a–26f of the extractor. As previously indicated, this is accomplished by the positive timing belt connection between the feeder drive shaft 60 and the camshaft 30 that operates the upper cups. The feeder chain conveyors are thus adapted to sequentially eject fruit at a very rapid rate into the respective lower cups 21a–21f when the respective upper cups are elevated.

The motor 52 drives the camshaft 30 at a constant speed. The cam discs 31 of the extractor cup sequential drive mechanism act on respective cam follower arms 32 to reciprocate, in a predetermined sequence, the cup shafts 27 downwardly and upwardly between their uppermost positions (approximately cup 26b in FIG. 1) and their lowermost positions (cup 26a in FIG. 1). The cam discs 31 are identical and are arranged on the camshaft in multiples of 60° out-of-phase with each other to provide the sequence of driving of the upper cups as mentioned hereinbefore. With such arrangement, only one upper extractor cup is acting to fully compress a fruit during any point in time. This arrangement provides a balanced and relatively constant, unidirectional torque on the camshaft. That is, the cam arrangement minimizes fluctuations in drive torque exerted on the camshaft while keeping the maximum required drive torque to a minimum. This greatly reduces the power required to extract juice and eliminates the necessity of providing a high slip motor to accommodate abrupt and drastic reversal of load on the motor. Moreover, unidirectional torque exerted on the camshaft 30 minimizes bearing wear and substantially lowers the noise associated with the apparatus.

The aforedescribed cam follower arm arrangement offers major advantages over the direct cam follower arrangement of prior art citrus fruit extractors including the reduction of the overall height of the extractor and a reduction of the pressure angle on the cam discs. Also, since the cam follower arms 32 are operatively connected to the cup shafts 27 at points between the bearings 79 and 80, and since the distance between the lower bearings 80 and fully lowered upper cups 26a–26f is relatively small (as compared to the prior art arrangements), there is very little tendency for the cam drive mechanism to force the upper cups out of axial alignment with the lower cups.

The orifice tubes 36a–36f are sequentially driven in timed relation to the movement of the associated upper extractor cups 26a–26f by the multiple master cylinder 39 and slave cylinder 37 arrangement. The cam discs 41 are arranged in paired assemblies with the cup drive cam discs 31 so that the master and slave cylinders provide synchronous operation of the upper cups and orifice tubes. Accordingly, the slave cylinders fully lower an orifice tube when the associated upper cup is substantially raised (see cup 26b and orifice tube 36b in FIG. 1) and will substantially elevate an orifice tube when the corresponding upper cup is fully lowered (see cup 26a and orifice tube 36a). Generally, an orifice tube is forced toward the lower cup into the associated strainer tube 24 at a rate which achieves increasingly greater pressure in the strainer tube as more of the contents of the fruit are forced into the strainer tube by the interdigitation of the associated upper and lower cups.

As previously indicated, the extraction principle of the extractor 10 is well-known. Juice forced through the perforated upper ends of the strainer tubes 24 is collected within the manifold 23 and flows therefrom through outlet conduits 25 to further juice processing equipment. The membrane, seeds, etc. of the fruit that are separated from the juice are forced into the upper ends of the orifice tubes 36a–36f, and such matter is eventually ejected from openings 40 in the bottom ends of the orifice tubes. During extraction, the peels of the fruit are cut into strips by the fingers of the upper extractor cups, as shown in the aforementioned U.S. Pat. No. 2,780,988. Also, the oils exuded from the peels during extraction are captured in water which is sprayed from rings incorporated in the upper extractor cups, as disclosed in U.S. Pat. No. 3,717,084 to Robbins et al. The shredded peels and oil-water emulsion falls onto the bedplate 18 and thereafter drain over a wall (not shown) onto a conveyor system (not illustrated) so that the oil may be separated from the mixture and so that the peel may be further processed.

In the event that a foreign object that is harder than the fruit is accidentally fed to an extractor cup, the clamp block assembly 33 clamped to the associated cup shaft 27 will slide downwardly on such cup shaft to prevent damage to the extractor. The air spring piston 84 at the end of the cup shaft will rise higher than normal within the tube 81 of the associated air spring 34. A limit switch (not illustrated) is mounted adjacent the upper end of each of the air spring cylinders at a position to be engaged by such elevated piston. This limit switch is connected to motor starter 52a to de-energize the motor.

In the event that an orifice tube becomes stuck or obstructed, an extraordinary increase in oil pressure will be generated by the associated master cylinder 39. Such increase in pressure will be transmitted through the associated conduit 158 to the manifold 159 to actuate the pressure-sensitive cut-off switch 161 to thereby stop the motor 52. In the event of such excessive pressure, valve 164 connected to the manifold will by-pass oil back to the diaphragm-actuated reservoir 152. It is further noted that small pressure peaks associated with oil expansion in the system will be bled through the flow restrictor 162 back to the reservoir to thereby avoid untimely activation of cut-off switch 161.

Although the best mode contemplated for carrying out the present invention has been herein shown and described, it will be apparent that modification and variation may be made without departing from what is regarded to be the subject matter of the invention.

What is claimed is:

1. A citrus fruit juice extractor comprising: a plurality of aligned pairs of opposing cups, each of said cups including spaced apart fingers defining a cavity for receiving a fruit, said opposing cups in each pair being adapted to interdigitate to compress said fruit as they are moved together to thereby extract juice from the fruit, strainer tubes respectively communicating with one of said cups of each of said pairs of cups for providing passages for juice extracted from the fruit, means for moving said opposing cups together to compress the fruit therebetween and cause the juice to be directed to the strainer tubes, said means for moving said cups together including a drive shaft and a motor for reciprocating said shaft at a selected speed, a plurality of driving means operatively connected to said shaft for sequentially driving one cup of each of said pairs of cups toward the opposing cup, each of said plurality of driving means being connected to said drive shaft at a position angularly offset from those of the others of said driving means to cause said pairs of cups to compress the fruit therebetween at different rotative positions of the shaft so that said shaft is subjected to a relatively uniform unidirectional torque, orifice tubes slidably received within said strainer tubes for applying pressure to said juice and pulp to express juice from said strainer tubes, and means operatively connected to said drive shaft for sequentially reciprocating said orifice tubes within said strainer tubes in synchronous relationship to the driving of the cups associated with the strainer tubes.

2. A citrus fruit juice extractor comprising: a frame, a plurality of lower extractor cups mounted in a linear arrangement to said frame, each lower cup including spaced apart fingers for receiving a fruit from which juice is to be extracted, a plurality of upper cups, said each upper cup having fingers adapted to interdigitate with the fingers of a lower cup to compress the fruit therein to thereby extract juice therefrom, a plurality of strainer tubes each communicating with a lower cup for receiving juice and pulpy material expressed from a fruit, a plurality of orifice tubes, each orifice tube being slidably received within a strainer tube, and means for driving said upper cups in a predetermined sequence to force them downwardly to interdigitate with said lower cups to thereby sequentially extract juice from the fruit in the lower cups, said upper cup driving means including a shaft rotatably mounted to said frame, a motor for rotating the shaft, and means engaging said shaft for sequentially driving said upper cups in a preselected sequence, and means operatively connected to said shaft for sequentially reciprocating said orifice tubes in their associated strainer tubes in the same sequence as said predetermined sequence to thereby move the orifice tubes in timed relationship to the associated upper cups.

3. A citrus fruit juice extractor comprising: a support frame, a plurality of lower cups rigidly mounted in a single file to said support frame, an equal plurality of upper cups, said upper and lower cups including interdigitatable fingers contoured to form opposing cavities, a perforated strainer tube extending downwardly from the interior of each lower cup for receiving juice and interior portions of a fruit during the squeezing of the fruit between the lower and upper cup, an orifice tube slidably received within each of the strainer tubes, means for sequentially driving said upper cups into interdigitation with the respective lower cups to compress fruit supported in the lower cups, means for reciprocating said orifice tubes in timed relationship to the sequential movements of said upper cups to thereby force extracted juice through the strainer tubes, said means for driving said upper cups including an elongate support member extending upwardly from each upper cup, bearing means mounted to said frame for guiding said support members along paths which are aligned with the underlying lower cups, means for normally urging said support members away from the respective lower cups, a camshaft rotatably mounted to said frame to extend transversely of said support members and including a plurality of cams, a motor for rotating said camshaft, and a plurality of cam follower means respectively coupled between said support members and said frame and respectively engaging said cams for sequentially driving said support members as said camshaft is driven by said motor, said cams being affixed to said drive shaft at different rotational orientations and in a predetermined phase relationship to thereby cause the upper cups to move sequentially with respect to each other, said means for reciprocating said orifice tubes being operatively connected to said camshaft to cause said orifice tubes to move synchronously with the associated upper cups.

4. The citrus fruit juice extractor according to claim 3 wherein said means for reciprocating said orifice tubes includes a plurality of slave cylinders respectively connected to said orifice tubes, a plurality of master cylinders mounted to said frame, conduits respectively connecting said master cylinders and said slave cylinders, a plurality of further cams mounted on said camshaft, a plurality of further cam follower means that are respectively engaged by said further cams for sequentially energizing said master cylinders to thereby sequentially energize said slave cylinders, said further cams being arranged on said camshaft to cause said slave cylinders and thus said orifice tubes to operate in timed relationship to the movements of the associated upper cups.

5. A citrus fruit juice extractor comprising: a support frame, several aligned pairs of opposed extractor cups, each of said extractor cups including spaced apart fingers for defining a fruit-receiving cavity, one of each pair of cups being stationarily mounted to said support frame and the other cup of each pair of cups being movably mounted to said frame so that the fingers thereof interdigitate with the fingers of the said one cup, means for sequentially driving said movable cups into interdigitating relation with the stationary cups to extract juice from fruit engaged between said cups, said driving means including a camshaft rotatably mounted to said frame, a motor operatively connected to said camshaft, said camshaft including several cams, several cam follower means respectively engaging said cams for respectively driving the movable cups, said several cams being arranged on said camshaft at uniformly angularly spaced positions to induce a relatively uniform unidirectional torque on said camshaft as said upper cups are driven, each of said several cam follower means comprising a cam follower arm that is pivotally connected at one end to said frame and that is operatively connected at its other end to the associated movable extractor cup and a roller mounted to said arm at a position to engage the associated cam, said arms being pivotally mounted to said frame to project between the cams and the extractor cups to sequentially drive the associated movable cups into interdigitation with said stationary cups as said camshaft is rotated, and means for normally urging said movable cups away from said stationary cups to thereby retract the movable cups from the stationary cups while biasing the cam follower rollers against the associated cams.

6. A citrus fruit juice extractor comprising: a support frame, a plurality of lower cups rigidly mounted in a single file to said support frame, an equal plurality of upper cups, said upper and lower cups including interdigitatable fingers contoured to form opposing cavities, a perforated strainer tube extending downwardly from the interior of each lower cup for receiving juice and interior portions of a fruit during the squeezing of the fruit between the lower and upper cup, an orifice tube slidably received within each of the strainer tubes, means for sequentially driving said upper cups into interdigitation with the respective lower cups to compress fruit supported in the lower cups, means for reciprocating said orifice tubes in timed relationships to the sequential movements of said upper cups to thereby force juice through the strainer tubes, said means for driving said upper cups including a rod extending upwardly from said upper cups, bearing means mounted to said frame for guiding said rods along paths which are aligned with the underlying lower cups, a camshaft rotatably mounted to said frame to extend transversely of said rods, a motor for rotating said camshaft, a plurality of cams affixed to said camshaft at positions aligned with said rods, several cam follower means respectively coupled between said rods and said frame and respectively engaging said cams for driving said rods as said camshaft is driven by said motor, said cams being affixed to said camshaft in predetermined angular relationships to thereby cause the cups to move sequentially with respect to each other, each of said several cam follower means including a cam follower arm that is pivotally connected at one end to said frame and that is operatively connected at its other end to a clamp assembly attached to the associated rod, said clamp assemblies being adjustably attached to the support rods so that the fingers of the upper cups interdigitate with the fingers of the opposing lower cups, and said means for reciprocating said orifice tubes being operatively connected to said camshaft.

7. A citrus fruit juice extractor comprising: a frame, several pairs of opposing extractor cups, each cup including spaced apart fingers adapted to interdigitate with the fingers of the opposing cup to compress a fruit received therebetween, a camshaft rotatably mounted to the frame and having several cams thereon, a motor operatively connected to said camshaft, each pair of cups including a cup stationarily mounted to said frame and a movable cup, a support member for rigidly mounting each movable cup, means for individually guiding said support members to cause said movable cups to move into interdigitation with the stationary cups, and several separate cam follower means operatively connected between said cams and said support members for sequentially driving said support members and thus said movable cups toward said lower cups to sequentially extract juice from fruit engaged between said opposed cups.

8. A citrus fruit juice extractor comprising:
a frame, several pairs of opposing extractor cups, each cup including spaced apart fingers adapted to interdigitate with the fingers of the opposing cup to compress a fruit received therebetween, a camshaft rotatably mounted to the frame and having several cams thereon, a motor operatively connected to said camshaft, each pair of cups including a cup stationarily mounted to said frame and a movable cup, a support member for rigidly mounting each movable cup, means for individually guiding said support members to cause said movable cups to move into interdigitation with the stationary cups, and several separate cam follower means operatively connected between said cams and said support members for sequentially driving said support members and thus said movable cups toward said lower cups to sequentially extract juice from fruit engaged between said opposed cups, said support members comprising rods that are rigidly connected to said movable cups, said guiding means comprising bearings mounted to said frame to guide said rods along straight line paths aligned with the opposing stationary cups, and each of said several cam follower means including a clamp assembly secured to a rod to permit the rod to slide relative thereto when an object which is harder than a fruit is engaged by a movable cup.

9. A fruit juice extractor comprising: a plurality of pairs of opposed cups, each of said cups including spaced apart fingers defining a cavity for receiving a fruit, said opposing cups in each pair being adapted to interdigitate to compress said fruit as they are moved together to thereby extract juice from the fruit, strainer tubes respectively communicating with said pairs of cups for providing passages for juice extracted from the fruit, means for moving said opposing cups together to compress the fruit therebetween and cause the juice to be directed into the respective passages, said means for moving said cups together including a drive shaft and a motor for rotating said shaft at a selected speed, means operatively connected to said shaft for driving one cup of each of said pairs of cups toward the opposing cup, said driving means being connected to said drive shaft to cause said plurality of pairs of cups to each compress the fruit therebetween at different rotative positions of the shaft so that said shaft is subjected to torque in only one rotative direction, orifice tubes slidably received within said strainer tubes, means operatively connected to said drive shaft for reciprocating said orifice tubes within said strainer tubes in synchronous relation to the driving of the cups associated with the strainer tubes, said means for reciprocating said orifice tubes comprising a plurality of master hydraulic cylinders, means operatively connected to said drive shaft for sequentially energizing said master hydraulic cylinders in timed sequence with the driving of said movable cups, a plurality of slave hydraulic cylinders operatively connected between said frame and said orifice tubes, and a plurality of conduits respectively extending between said master and slave hydraulic cylinders to cause said slave hydraulic cylinders to reciprocate said orifice tubes when the associated master hydraulic cylinders are energized.

10. The extractor according to claim 9 further comprising a manifold, further conduits respectively communicating between the slave hydraulic cylinders and said manifold, pressure-sensitive switch means connected to said manifold for de-energizing the extractor motor when the pressure within said manifold exceeds a preselected level whereby the motor will be de-energized when the movement of any of the orifice tubes becomes obstructed so as to raise the pressure in the associated slave hydraulic cylinder above said preselected level.

11. A citrus fruit juice extractor comprising: a frame, several aligned pairs of opposed extractor cups, each cup including spaced apart fingers adapted to interdigitate with the fingers of the opposing cup to compress a fruit therebetween, a camshaft rotatably mounted to the frame and having several cams thereon mounted in different rotative orientations, a motor operatively connected to said camshaft, each pair of opposed cups including a cup stationarily mounted to said frame and a movable cup, each movable cup being mounted to a support member, means for guiding said support members to cause said movable cups to move into and out of interdigitation with the stationary cups, several separate cam follower means operatively connected between said camshaft and said support members for sequentially driving said support members and thus said movable cups toward said lower cups to sequentially compress the fruit engaged between said cups, a strainer tube extending from one cup of each pair of opposing cups for providing a passage for juice and internal portions of the fruit as the fruit is compressed, each strainer tube having small outlets adapted to permit juice to pass therethrough, an orifice tube slidably received within each strainer tube, and means for reciprocating said orifice tubes within said strainer tubes in timed sequential relation to the sequential driving of the associated movable cups, said orifice tube reciprocating means being operatively connected to said camshaft, said support members comprising rods that are respectively rigidly connected to said movable cups, said guiding means comprising bearings mounted to said frame to guide said rods along straight line paths aligned with the opposed stationary cups, and each of said several cam follower means including a clamp assembly secured to a rod to permit the rod to slide relative thereto when an object which is harder than a fruit is engaged by the associated movable cup.

12. The apparatus according to claim 11 wherein each of said support members comprises a rod, each of said several cam follower means includes a cam follower arm that is pivotally connected at one end to the frame and that is operatively connected at its other end to a support rod, the cams including cam surfaces formed on their perimeters, said cam follower means further including rollers mounted on the arms for respectively engaging the cam surfaces, said guiding means including a pair of bearings that are spaced apart along a straight line extending through the associated stationary cup, each of said cam follower arms being connected to its associated support rod by an adjustable clamp assembly at a location on the support rod between said bearings, means for guiding the clamp assemblies as the cam follower arms are pivoted by the cams, and said rods being secured within said clamp assemblies so that the fingers of the attached cup interdigitate with the fingers of the opposing stationary cup.

13. The citrus juice extractor according to claim 11 wherein said means for reciprocating the orifice tubes within the strainer tubes comprises several master hydraulic cylinders, cam follower means operatively connected to said camshaft for sequentially energizing said master cylinders in timed sequence with the driving of said movable cups, several slave hydraulic cylinders operatively connected between said frame and said orifice tubes, and several conduits respectively extending between said master and slave hydraulic cylinders to cause said slave cylinders to reciprocate said orifice tubes when said master cylinders are energized.

14. The citrus juice extractor according to claim 13 further comprising a manifold, further conduits respectively communicating between the slave hydraulic cylinders and said manifold, pressure-sensitive switch means connected to said manifold for de-energizing the extractor motor when the pressure within said manifold exceeds a preselected level whereby the motor will be de-energized when the movement of any of the orifice tubes becomes obstructed so as to raise the pressure in the associated slave hydraulic cylinder above said preselected level.

* * * * *